Patented Aug. 5, 1941

2,251,870

UNITED STATES PATENT OFFICE 2,251,870

PIGMENT

David L. Gamble and James H. Haslam, Palmerton, Pa., assignors to The New Jersey Zinc Company, New York, N. Y., a corporation of New Jersey No Drawing. Application April 11, 1939, Serial No. 267,322

10 Claims. (Cl. 106—296)

This invention relates to the manufacture of zinc oxide pigments in which the zinc oxide particles are surface-coated with a zinc phosphate. In our copending application for Letters Patent of the United States, Serial No. 266,410 filed April 6, 1939, we have described and claimed such zinc oxide pigments, and have pointed out that such pigments are characterized by reduced reactivity towards acidic constituents of paint vehicles and by a high resistance to metallic staining.

The present invention is particularly directed to pyrometallurgical methods of coating zinc oxide with phosphates for the production of zinc oxide pigments possessing substantially the same properties as the zinc oxide pigments described and claimed in our aforementioned application. In accordance with the methods of the invention, the surfaces of zinc oxide particles are caused to react with a phosphate-forming agent, by suddenly heating a phosphoric acid to a high temperature to produce metaphosphoric acid in a form selected from the group consisting of vapor and fume and immediately reacting the metaphosphoric acid thus dispersed with dry and heated zinc oxide particles, whereby the formation of highly involatile polymers of metaphosphoric acid is obviated. As claimed in our co-pending applications Serial Nos. 391,408 and 391,409 filed May 1, 1941 (which are continuations-in-part of the instant application) the zinc oxide particles may also be coated by heating them in the presence of phosphorous pentoxide under such conditions that this reagent has a substantial vapor pressure or by heating the zinc oxide particles in the presence of a phosphoric acid ester at a temperature such that the ester reacts with the zinc oxide. Depending upon the particular phosphating agent employed and the method of obtaining intimate contact of the zinc oxide particles therewith, the zinc oxide particles may be heated to a temperature of from about 100° C. to about 900° C., or even higher. At the higher temperatures, care should be taken to avoid or minimize particle size growth of the zinc oxide particles by limiting the time that such particles are exposed to the high temperature.

The invention will be best understood from the following illustrative examples of its practice. While the methods described in these examples are particularly effective in forming phosphate coatings upon zinc oxide, the invention may be practiced in other ways, and the examples are to be understood as illustrating the principles underlying the invention and in no way restrictive of its practical application.

*Example 1.*—Orthophosphoric acid in the form of a concentrated solution is introduced directly, for example, by atomizing, into the combustion chamber of a zinc oxide furnace; that is to say, into a furnace chamber in which zinc vapor is being burned by an oxidizing gas such as air to zinc oxide. The temperature of this combustion chamber may vary from point to point within the usual range of 700 to 1400° C. However, at the point of introduction of the acid the temperature should be at least 900° C. and preferably 1000° C., and it is preferable to maintain the combustion chamber as a whole at a temperature exceeding 900° C. At this temperature the orthophosphoric acid, $H_3PO_4$, is rapidly dehydrated to metaphosphoric acid, $HPO_3$. The result is the vaporization or transformation to a highly dispersed fume, of metaphosphoric acid or at least of a phosphorous compound capable of transforming the surfaces of a large part of the zinc oxide fume being produced in the combustion chamber to zinc metaphosphate. In order to obviate the formation of highly involatile polymers of metaphosphoric acid, it is desirable in this operation to subject the orthophosphoric acid suddenly to intense heat, as, for example, by introducing the solution of orthophosphoric acid in such a way that it impinges directly upon an intensely heated refractory surface, or by introducing it through a carbon arc.

This method cannot be relied upon to coat the surfaces of all the zinc oxide particles with zinc phosphate. The surfaces of some of the particles are apparently protected from reacting with the phosphatizing reagent by flocculation. Moreover, individual particles of zinc phosphate are apparently formed to some extent by direct reaction of phosphoric acid with metallic zinc vapor. However, the method does coat a large percentage of the zinc oxide particles, with resulting substantial reduction in the reactivity of the zinc oxide obtained.

*Example 2.*—A solution of pyrophosphoric acid is atomized into the combustion chamber of the zinc oxide furnace. The temperature of the combustion chamber and of the point of introduction of the spray is maintained in the same range as in Example 1. At this temperature pyrophosphoric acid, $H_4P_2O_7$, is rapidly dehydrated to metaphosphoric acid, $HPO_3$. As in the case of orthophosphoric acid, it is desirable in this operation to subject the pyrophosphoric acid suddenly to high temperature, in order to obviate the formation of highly involatile polymers of metaphosphoric acid. The result of the treatment is the formation of a zinc oxide, the particles of which are coated with zinc metaphosphate.

Example 3.—A solution of metaphosphoric acid is atomized into the combustion chamber of the zinc oxide furnace, the temperature of the combustion chamber and of the point of introduction of the spray being maintained in the same range as in Example 1. In this case the acid does not need to be dehydrated, since it is already in the form of metaphosphoric acid, $HPO_3$. However, it is in this case so much the more necessary to prevent the formation of highly involatile polymers of metaphosphoric acid. In consequence, it is highly desirable to volatilize the acid (or transform it to a highly dispersed fume) with great rapidity, as, for example, by causing the entering stream of metaphosphoric acid solution to impinge directly upon a hot refractory wall. Zinc oxide thus treated comprises particles coated with zinc metaphosphate.

Treatment with 5% metaphosphoric acid by the above method has been found adequate to produce zinc oxide with a high degree of non-reactivity.

In all methods in which phosphoric acids are atomized into the combustion chamber of a zinc oxide furnace, it is desirable for the spray to enter the combustion chamber at a point remote from the zinc flame, i. e., near the outlet from the combustion chamber. This expedient is helpful in preventing direct reaction of the phosphoric acid with zinc vapor, with a consequent formation of zinc phosphates in the undesirable form of separate particles, instead of in the desired form of a coating upon the surface of the zinc oxide particles.

Example 4.—A fine spray of phosphoric acid such as orthophosphoric acid, pyrophosphoric acid or metaphosphoric acid is introduced into freshly formed zinc oxide fume just beyond the combustion chamber of a zinc oxide furnace, while the fume is still hot. It is desirable for the temperature of the fume to be substantially above 700° C., preferably in the neighborhood of 1000° C., at the point where the spray of acid is introduced. A specially heated or heat insulated flue may be provided adjoining the combustion chamber for the purpose of maintaining the zinc oxide fume at a sufficiently high temperature. An advantage of this method is that direct reaction of phosphoric acid with metallic zinc, with resulting formation of separate particles of zinc phosphate instead of the formation of a coating of zinc phosphate upon the zinc oxide particles, is effectively obviated.

The phosphate coating upon the zinc oxide particles may be in the form of zinc orthophosphate, zinc pyrophosphate or zinc metaphosphate. The latter form is preferred.

In determining by infrared absorption spectra methods the type of zinc phosphate coating obtained, the following procedure is used. The pigment to be examined is mulled thoroughly with amyl alcohol and a thin layer of the pigment alcohol paste is spread on a plate of rock salt or of other substance transparent to infrared. After the alcohol has evaporated, the absorption spectrum of the film of dry powder is determined. Zinc metaphosphate exhibits a sharp absorption band in the neighborhood of 9 mu. In the case of zinc orthophosphate, the absorption band in this region is very much broader and in the case of zinc pyrophosphate the band is still more broad and diffuse. On the basis of these characteristic differences in the absorption spectra, it is quite easy to distinguish the zinc metaphosphate from either the ortho- or pyrophosphate. To distinguish the orthophosphate from the pyrophosphate is considerably more difficult and the indications obtained less reliable. The intensity of the absorption band, that is, its depth, is a function of both the amount of phosphate associated with the zinc oxide as well as the uniformity of distribution.

In the following table a comparison is made of the reactivities of several zinc oxides phosphated by different pyrometallurgical methods with (1) a zinc oxide wet-treated with metaphosphoric acid and having a relatively high degree of nonreactivity, and (2) normal untreated zinc oxide. The reactivity numbers appearing in the table are a measure of the reactivity of the several zinc oxides with the acidic constituents of oleoresinous vehicles, and were obtained as follows: The sample of zinc oxide pigment is suspended in a solution of linseed fatty acids in alcohol of known concentration. The pigment is allowed to stand in contact with this solution for 1½ hours and the concentration of fatty acid remaining in solution with the alcohol is determined after this time interval. If the zinc oxide is reactive, the concentration of fatty acid in solution will be reduced by virtue of the reaction of the zinc oxide and the fatty acid to form insoluble soap. The changes in concentration are determined by index of refraction methods. The reactivity is expressed in terms of the per cent of original concentration of fatty acids remaining after 1½ hours' contact with the pigment. The greater the reactivity number expressed in this way the less reactive is the zinc oxide. It should be pointed out that this test is not a particularly severe one and that under more severe testing conditions most of these pyrometallurgically treated zinc oxides would compare less favorably with the wet treated zinc oxide.

| | Description of zinc oxide sample | Reactivity number — Per cent of original concentration of fatty acids remaining after 1½ hours' contact with pigment |
|---|---|---|
| 1 | Orthophosphoric acid added in the combustion chamber of a commercial zinc oxide furnace | 83.4 |
| 2 | Metaphosphoric acid added in combustion chamber of a laboratory experimental zinc oxide furnace | 90.3 |
| 3 | Ethyl metaphosphate atomized into combustion chamber of laboratory experimental zinc oxide furnace | 91.0 |
| 4 | The same oxide as No. 3 given a reheating for 15 minutes at 800° C | 98.5 |
| 5 | Zinc oxide reheated in vacuum with $P_2O_5$ | 97.5 |
| 6 | Zinc oxide reheated in air with red phosphorus | 91.0 |
| 7 | Wet treatment of zinc oxide with 3% metaphosphoric acid | 99.0 |
| 8 | Normal untreated zinc oxide | 35 |

A zinc oxide pigment having its particles surface-coated with a zinc phosphate in accordance with the pyrometallurgical methods of the invention possesses substantially the same desirable properties of reduced reactivity towards acidic constituents of paint vehicles and high resistance to metallic staining as do the zinc oxide pigments whose particles are similarly coated with a zinc phosphate by wet methods. As compared with wet methods of coating zinc oxide particles with zinc phosphate, the methods of the invention avoid the handling of large quantities of solutions or slurries, and the consequent use of mixing, filtering and drying equipment is either entirely eliminated or greatly restricted.

We claim:

1. In the manufacture of a zinc oxide pigment involving coating particles of zinc oxide with a zinc phosphate, the improvement which comprises suddenly heating phosphoric acid to a high temperature to produce metaphosphoric acid in a form selected from the group consisting of vapor and fume and immediately reacting the metaphosphoric acid thus dispersed with dry and heated zinc oxide particles whereby the formation of highly involatile polymers of metaphosphoric acid is obviated.

2. In the manufacture of a zinc oxide pigment, the improvement which comprises suddenly heating a phosphoric acid to a high temperature to produce a hot dispersion of substantially unpolymerized metaphosphoric acid in a form selected from the group consisting of vapor and fume and immediately reacting the hot unpolymerized metaphosphoric acid thus dispersed with dry zinc oxide particles having a temperature of at least 700° C.

3. In the manufacture of a zinc oxide pigment involving coating particles of zinc oxide with a zinc phosphate, the improvement which comprises suddenly heating a phosphoric acid to produce a hot dispersion of metaphosphoric acid in a form selected from the group consisting of vapor and fume of said acid while avoiding the formation of highly involatile polymers or metaphosphoric acid and immediately contacting freshly-formed dry hot zinc oxide particles with the metaphosphoric acid dispersion to cause the metaphosphoric acid to react with the zinc oxide.

4. In the manufacture of a zinc oxide pigment in which the zinc oxide particles are surface-coated with a zinc phosphate, the improvement which comprises treating dry and heated zinc oxide particles with metaphosphoric acid in a form selected from the group consisting of vapor and fume of said acid, said form being produced by suddenly heating phosphoric acid to a high temperature, thereby avoiding the formation of highly involatile polymers of the metaphosphoric acid.

5. In the manufacture of a zinc oxide pigment in which zinc oxide particles are surface-coated with a zinc phosphate, the improvement which comprises intimately contacting zinc oxide fume in the flue system of a zinc oxide furnace while the fume is heated to a temperature not less than 700° C. and preferably to a temperature of at least 1000° C. with a freshly formed dispersion of substantially unpolymerized metaphosphoric acid in a form selected from the group consisting of vapor and fume, said dispersion being produced by suddenly heating metaphosphoric acid to a high temperature.

6. In the manufacture of a zinc oxide pigment in which zinc oxide particles are surface-coated with a zinc phosphate, the improvement which comprises bringing a phosphoric acid into contact with dry and heated zinc oxide particles and simultaneously suddenly heating said phosphoric acid to a high temperature to produce a fume of metaphosphoric acid in contact with the zinc oxide particles while avoiding the formation of highly involatile polymers of metaphosphoric acid.

7. Process according to claim 6 in which the phosphoric acid is suddenly heated by being introduced into a chamber containing highly heated zinc oxide fume freshly formed by combustion of zinc vapor.

8. Process according to claim 6 in which the phosphoric acid in solution is sprayed into a chamber into contact with highly heated zinc oxide freshly formed by the combustion of zinc vapor, the zone in the chamber at which the phosphoric acid is introduced being maintained at a temperature of at least 900° C.

9. Process according to claim 6 in which the phosphoric acid is introduced into a chamber into contact with highly heated zinc oxide freshly formed by combustion of zinc vapor, the introduction being such that contact between the phosphoric acid and the zinc vapor is substantially avoided.

10. In the manufacture of zinc oxide pigment in which zinc oxide particles are surface-coated with a zinc phosphate, the improvement which comprises suddenly heating a phosphoric acid to a high temperature to produce substantially unpolymerized metaphosphoric acid in a form selected from the group consisting of vapor and fume and reacting the unpolymerized metaphosphoric acid in said form with dry and heated zinc oxide particles.

DAVID L. GAMBLE.
JAMES H. HASLAM.